United States Patent
Kalergis et al.

(10) Patent No.: US 9,421,915 B2
(45) Date of Patent: Aug. 23, 2016

(54) FOLDING SEAT ASSEMBLY WITH INTERNAL STORAGE COMPARTMENT

(71) Applicant: FORD GLOBAL TECHNOLOGIES, LLC, Dearborn, MI (US)

(72) Inventors: Peter Nicholas Kalergis, Canton, MI (US); Frank Victor Bonello, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/535,858

(22) Filed: Nov. 7, 2014

(65) Prior Publication Data

US 2016/0129845 A1 May 12, 2016

(51) Int. Cl.
- *A47C 7/62* (2006.01)
- *B60R 7/04* (2006.01)
- *B60N 2/02* (2006.01)
- *B60N 2/30* (2006.01)

(52) U.S. Cl.
CPC .................. *B60R 7/043* (2013.01); *B60N 2/02* (2013.01); *B60N 2/3047* (2013.01)

(58) Field of Classification Search
CPC .............................. B60R 7/043; B60N 2/3047
USPC ................ 297/188.1, 335, 337, 336, 188.13, 297/188.08, 188.09, 188.19; 296/37.15
See application file for complete search history.

(56) References Cited

U.S. PATENT DOCUMENTS

| | | | |
|---|---|---|---|
| 5,558,386 A * | 9/1996 | Tilly ....................... | B60N 2/305 292/111 |
| 5,816,650 A | 10/1998 | Lucas, Jr. | |
| 5,902,009 A * | 5/1999 | Singh ...................... | B60R 7/043 296/37.15 |
| 5,957,521 A | 9/1999 | Schlachter | |
| 6,102,463 A | 8/2000 | Swanson et al. | |
| 6,106,044 A * | 8/2000 | Schlachter .............. | B60R 7/043 296/37.15 |
| 6,161,896 A | 12/2000 | Johnson et al. | |
| 6,386,612 B2 * | 5/2002 | Hofmann ................ | B60R 7/043 224/275 |
| 6,390,547 B1 * | 5/2002 | Spykerman ............. | B60R 7/043 296/37.15 |
| 6,419,313 B1 * | 7/2002 | Newman .................. | B60N 2/70 296/37.15 |
| 6,540,279 B1 | 4/2003 | Bargiel | |
| 6,877,807 B2 * | 4/2005 | Mizuno ................... | B60R 7/043 297/188.08 |
| 7,121,606 B2 * | 10/2006 | Khan ....................... | B60R 7/043 224/275 |
| 7,517,014 B2 * | 4/2009 | Schroeder .............. | B64D 11/06 244/118.1 |
| 7,611,183 B2 * | 11/2009 | Burkey ................... | B60N 2/206 296/37.15 |
| 8,550,549 B2 * | 10/2013 | Baker .................... | B60N 2/3011 296/66 |
| 9,016,778 B2 * | 4/2015 | Hellman .................. | A47C 4/54 297/188.09 |
| 9,090,209 B2 * | 7/2015 | Aguirre ................... | B60R 7/043 |
| 2002/0005649 A1 * | 1/2002 | Hofmann ................ | B60R 7/043 296/37.15 |
| 2008/0061606 A1 * | 3/2008 | Skelly ..................... | B60N 2/62 297/188.1 |
| 2013/0038080 A1 | 2/2013 | Tate, Jr. | |

FOREIGN PATENT DOCUMENTS

| EP | 0980789 A1 | 2/2000 |
|---|---|---|
| JP | 2004196123 A | 7/2004 |

* cited by examiner

*Primary Examiner* — Chi Q Nguyen

(74) *Attorney, Agent, or Firm* — Vichit Chea; King & Schickli, PLLC

(57) ABSTRACT

A folding seat assembly is provided for a motor vehicle. The folding seat assembly includes a seat back, a seat base and an internal storage compartment. The seat base includes first and second sections that are independently pivotally displaceable between a raised position and a home position. The internal storage compartment is defined between the two sections of the seat base.

15 Claims, 4 Drawing Sheets

FOLDING SEAT ASSEMBLY WITH INTERNAL STORAGE COMPARTMENT

TECHNICAL FIELD

This document relates generally to the vehicle seating field and, more particularly, to a new and improved folding seat assembly incorporating an internal storage compartment.

BACKGROUND

Vehicle purchasers and operators express a strong desire for additional and more versatile storage in their motor vehicles. This need and desire is particularly important in crew cab pickup trucks where additional secure storage is often desired for expensive tools and the like.

This document relates to a new and improved folding seat assembly incorporating an internal storage compartment. Such an assembly is particularly useful in crew cab pickup trucks, SUVs and the like.

SUMMARY

In accordance with the purposes and benefits described herein, a folding seat assembly is provided for a motor vehicle. That folding seat assembly comprises a seat back, a seat base and an internal storage compartment. More specifically, the seat base includes a first section and a second section wherein the first and second sections are independently pivotally displaceable between a raised position and a home position. The internal storage compartment is defined between the first and second sections of the seat base creating additional storage space, while maintaining the flat load floor highly desired by customers.

In one possible embodiment, the seat assembly includes a support and a first pivot connection for pivotally attaching the first and second sections to the support. In one possible embodiment, the first section includes a first face forming a seating surface and a second face including a concavity forming a part of the internal storage compartment. The second section forms a tray facing the first section and open to the concavity in the first section.

In one possible embodiment, the seat assembly includes a lock for locking the first and second sections together to secure the internal storage compartment. In one embodiment, the lock includes a latch and a striker. In one embodiment, the lock further includes a key cylinder. In one possible embodiment, the lock is electronic and is hidden from view in the seat base when the first and second sections are closed and locked.

Further, in one possible embodiment the seat assembly includes an accordion storage file carried on the seat base. Still further, in one possible embodiment, the first and second sections pivot about a shared axis. Still further, in one possible embodiment the seat back, is pivotally connected to the support by a second pivot connection.

In the following description, there are shown and described several preferred embodiments of the folding seat assembly. As it should be realized, the folding seat assembly is capable of other, different embodiments and its several details are capable of modification in various, obvious aspects all without departing from the folding seat assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the folding seat assembly and together with the description serve to explain certain principles thereof. In the drawing.

Reference will now be made in detail to the present preferred embodiment of the folding seat assembly, examples of which are illustrated in the accompanying drawing figures.

DETAILED DESCRIPTION

Figure 1:
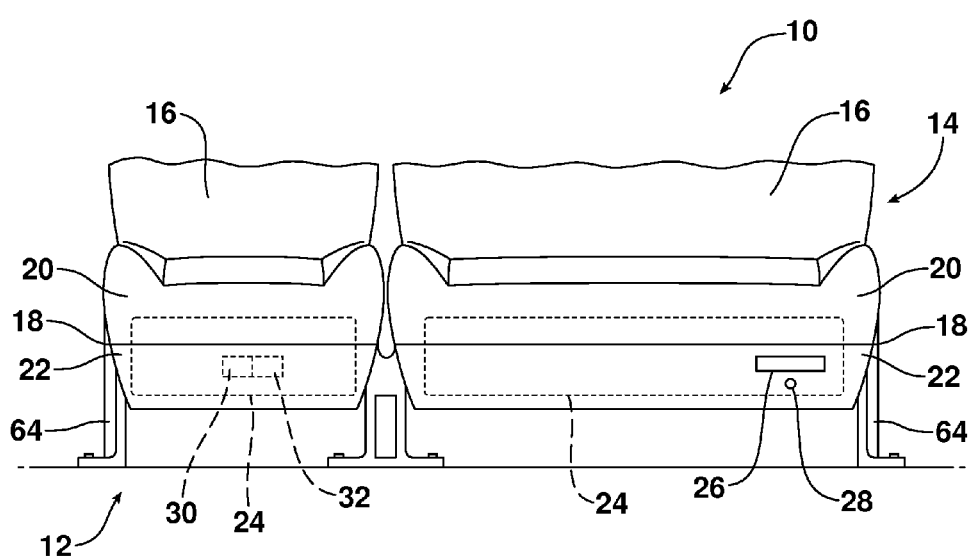
FIG. 1 is a front elevational view showing the folding seat assembly.

Reference is now made to FIG. 1 illustrating a folding seat assembly 10 split into two units 12, 14. Such a folding seat assembly 10 may be found, for example, in the rear of a crew cab pickup truck. As illustrated in FIG. 1, each unit 12, 14 of the folding seat assembly 10 includes a seat back 16 and a seat base 18. Each seat base 18 includes a first section 20 and a second section 22 that define an internal storage compartment 24. The first and second sections 20, 22 of the seat unit 14 may be locked together to secure the internal storage compartment by means of a lock 26. In one possible embodiment, the lock 26 includes a key cylinder 28 and is locked and unlocked by means of a key.

In another embodiment, the first and second sections 20, 22 of the seat unit 12 are locked together by an electronic lock 30. When the first and second sections 20, 22 are closed and locked, the electronic lock 30 is completely hidden from view.

While the key cylinder 28 of the lock 26 provides a visual clue as to the existence of the locking internal storage compartment 24, a seat equipped with the optional electronic lock 30 provides no such visual clue and thus the existence of the internal storage compartment and the lock remain undetectable to the casual observer. Of course, such an electronic lock 30 may be operated by means of a controller 32 which may take the form of a dedicated microprocessor. Such a controller 32 may incorporate a voice recognition module and allow for locking and unlocking of the electronic lock 30 to gain or prevent access to the internal storage compartment 24 by means of voice command.

Figure 2:
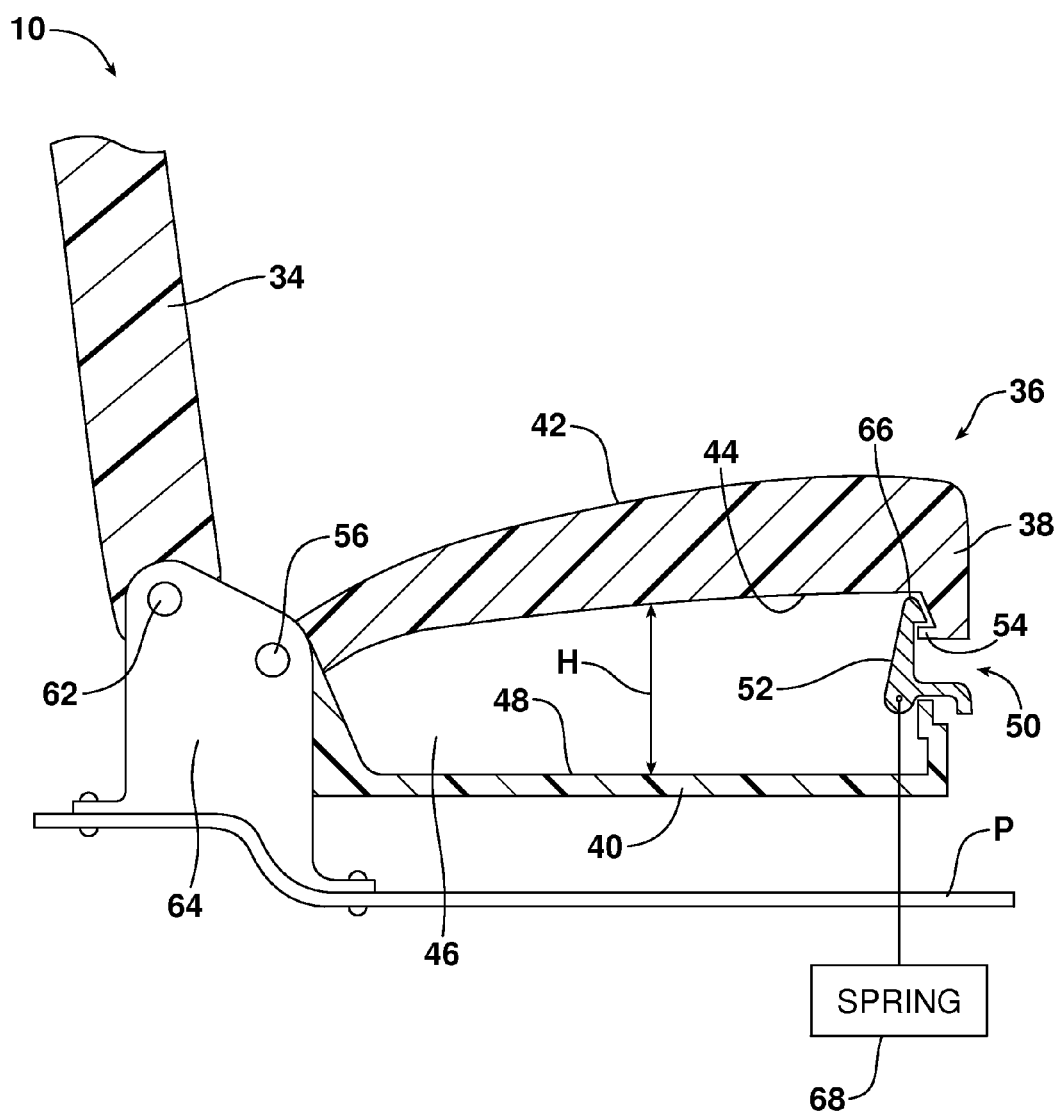
FIG. 2 is a schematic cross-sectional view illustrating another embodiment of the folding seat assembly including the seat mounting bracket or support utilized to anchor the seat assembly to the floor pan of the vehicle.

Reference is now made to FIG. 2 which is a schematic illustration of another embodiment of folding seat assembly 10. In this embodiment the folding seat assembly 10 includes the seat back 34 and the seat base 36 including the first section 38 and the second section 40. As should be appreciated from viewing FIG. 2, the first section 38 includes a first face 42 forming a seating surface and a second face 44 including a concavity that forms a part of the internal storage compartment 46. As further illustrated, the second section 40 includes a recess forming a tray 48 that faces and opens toward the concavity 44. Here it should be appreciated that the concavity 44 and the recessed tray 48 function together to maximize the height H of the internal storage compartment 46 while not compromising seat comfort.

A lock 50 includes a latch 52 pivotally connected to the second section 40. A striker or flange 54 on the first section 38 is engaged and held by the latch 52 when the lock 50 is in the locked position to secure the first and second sections 38, 40 together.

As further shown in FIG. 2, a first pivot connection in the form of a pin 56 extends through the proximal end of the second section 40 and the proximal end of the first section 38 so as to define a common or shared pivot access for the first and second sections. In the illustrated embodiment, a second pivot connection in the form of a pin 62 is received through the lower end of the seat back 34 which pivots about that axis. A support 64 receives the pivot pins 56, 62 and anchors the seat assembly 10 to the floor pan P of the vehicle.

Figure 3A:
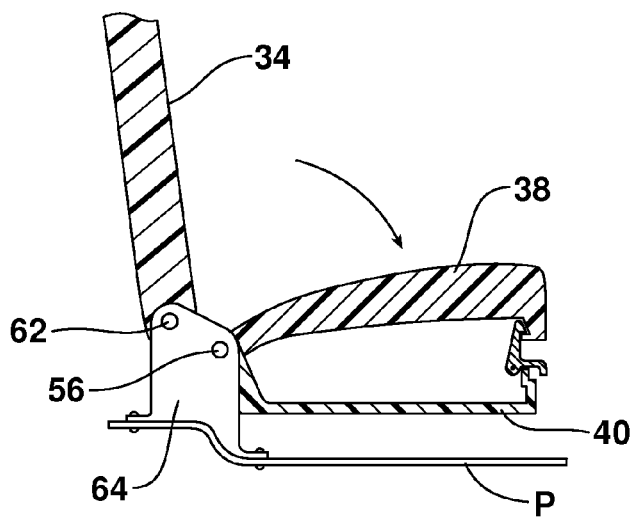
FIGS. 3a-3c are schematic side elevational views illustrating the pivotal movement of the first and second sections of the seat base of the folding seat assembly.
Figure 3B:
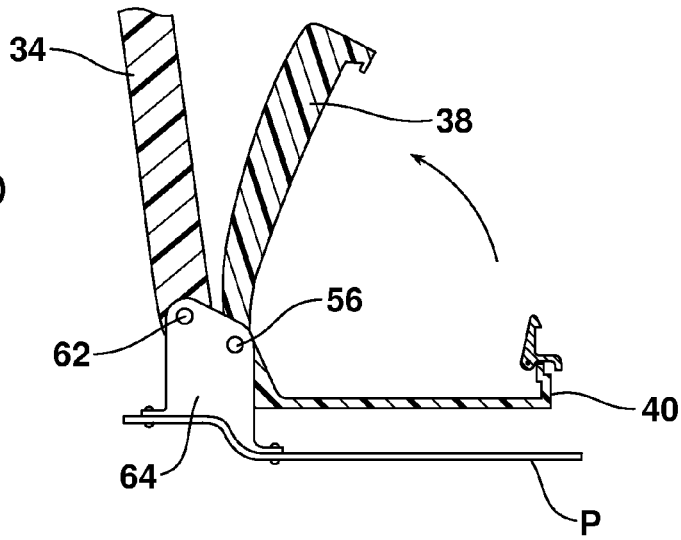
Figure 3C:
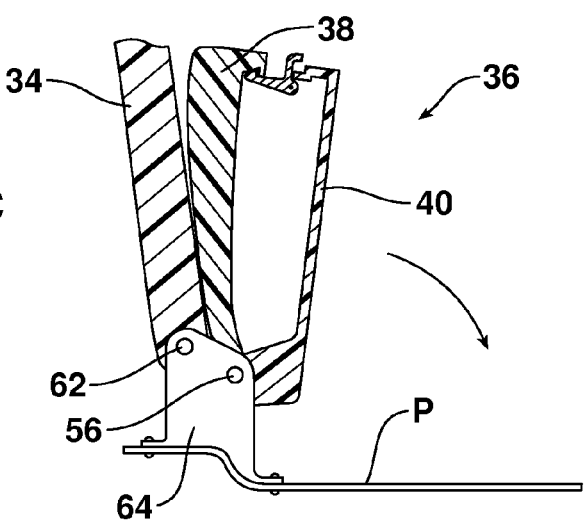

Reference is now made to FIGS. 3a-3c which illustrate how the first and second sections 38, 40 of the seat assembly 10 are independently pivotally displaceable between a raised position and a home position. More specifically, as illustrated in FIG. 3a, both the first section 38 and the second section 40 are pivoted down into the home position. In this position, the first face 42 of the first section 38 functions as a seating surface allowing an individual to comfortably sit with his back resting on the seat back 34.

As illustrated in FIG. 3b, when an operator wishes to access the internal storage compartment 46, the operator pivots the latch 52 (see also FIG. 2) to disengage the latch from the striker 54 thereby opening the lock 50. This allows the operator to lift the first section 38 of the seat base 36 into the raised position indicated in FIG. 3b, while the second section 40 of the seat base is maintained in the lowered or home position. This opens the internal storage compartment 46 for easy access. After gaining the required access, the individual may then simply close the internal storage compartment 46 by pivoting the first section back down into the home position whereby the cam surface 66 on the latch 52 allows the latch to pivot out of the way of the striker 54. Once the latch 52 clears the striker 54 and first section 38 is fully seated in the home position, an internal spring 68 in the latch 52 biases the latch into engagement with the striker 54 to again lock the storage compartment 46 in the closed position (note FIG. 2).

FIG. 3c illustrates the folding seat assembly 10 in the storage position with both of the first section 38 and second section 40 raised upright. Here it should be appreciated that the two sections 38, 40 may be displaced or pivoted independently from the home position to the raised or storage position. Alternatively, they may be moved together if desired.

Figure 4:
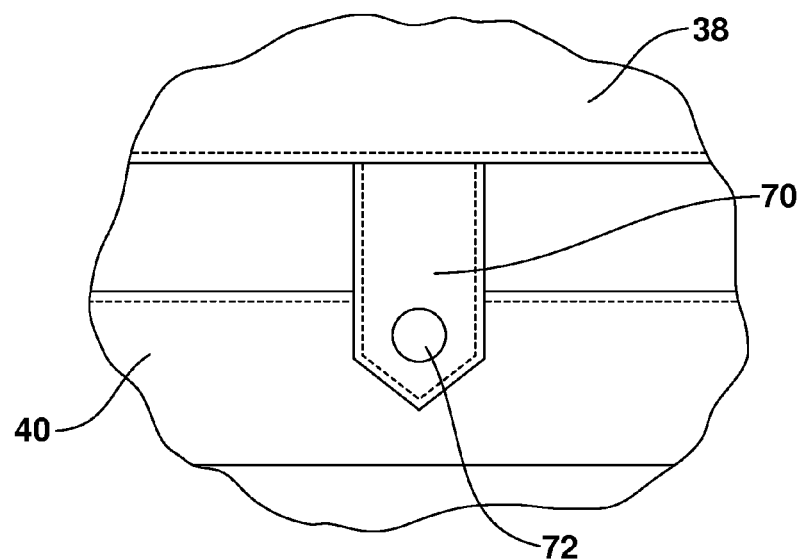
FIG. 4 is a detailed front elevational view of one additional possible lock option for the folding seat assembly.
Figure 5:
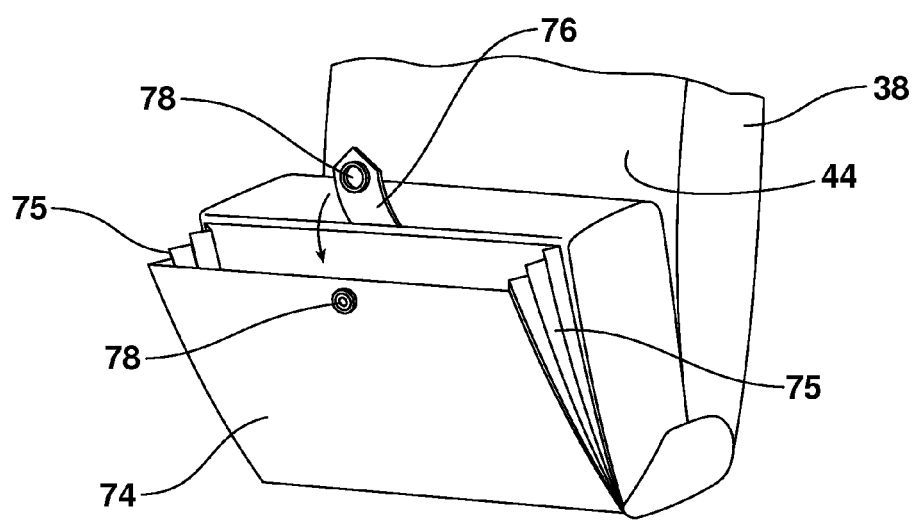
FIG. 5 is a detailed perspective view of an additional embodiment of the folding seat assembly incorporating an accordion storage file on the lower face of the first section of the seat base.

Reference is now made to FIGS. 4 and 5 illustrating some additional alternative embodiments of the folding seat assembly 10. In FIG. 4, the first section 38 of the seat base 36 is secured to the second section 40 of the seat base by means of the strap 70 connected to the first section and a cooperating snap attachment 72.

In FIG. 5, the lower or second face of the first section 38 incorporates an accordion storage file 74 including pleated sidewalls 75 that allow the storage file to expand. Such a file 74 may be filled with documents or other materials and then folded inwardly so as to be stored and configured within the concavity 44. A cooperating strap 76 and snap fastener 78 may hold the accordion storage file in the closed position. While the accordion storage file 74 in the illustrated embodiment is carried on the second face 44 of the first section 38 of the seat base 36, it should be appreciated that it could be carried or mounted on either side or face of the second section 40 if desired.

The foregoing has been presented for purposes of illustration and description. It is not intended to be exhaustive or to limit the embodiments to the precise form disclosed. Obvious modifications and variations are possible in light of the above teachings. For example, an elastic strap (not shown) may be provided on the second face of the first section 38 in the concavity 44. Such a strap may be used to hold an object in place in the internal storage compartment 46 when the first section is raised and lowered. Still further, a similar elastic strap may be provided in the second section tray 40, if desired, for the same purpose. Further, it should be appreciated that the seat back 34 may be configured to pivot downwardly onto the seat section 38 in the home position and thereby provide a flat, horizontal surface along the back of the seat back. Still further, while the two seat base sections 38, 40 illustrated in FIG. 2 share a common pivot connection 56, it should be appreciated that separate pivot connections may be used. All such modifications and variations are within the scope of the appended claims when interpreted in accordance with the breadth to which they are fairly, legally and equitably entitled.

What is claimed:

1. A folding seat assembly of a motor vehicle having a floor pan, comprising:
    a seat back;
    a seat base including a first section and a second section wherein said first section and said second section are independently pivotally displaceable between a raised position and a home position;
    an internal storage compartment defined between said first and second sections of said seat base;
    a lock for locking said first and second sections together to secure said internal storage compartment; and
    a support and a first pivot connection for pivotally attaching said first and second sections to said support, said support anchors the seat assembly to the floor pan,
    whereby the first and second sections are positioned above the floor pan in the raised position and the home position.

2. The seat assembly of claim 1, wherein said first section includes a first face forming a seating surface and a second face including a concavity forming a part of said internal storage compartment.

3. The seat assembly of claim 2, wherein said second section forms a tray facing said first section and open to said concavity in said first section.

4. The seat assembly of claim 3, wherein said lock includes a latch and a striker.

5. The seat assembly of claim 4, wherein said lock further includes a key cylinder.

6. The seat assembly of claim 5, wherein said lock is electronic and is hidden from view in said seat base when said first and second sections are closed and locked.

7. The seat assembly of claim 6, further including an accordion storage file carried on said seat base.

8. The seat assembly of claim 1, wherein said first section includes a first face forming a seating surface and a second face including a concavity forming a part of said internal storage compartment.

9. The seat assembly of claim 8, wherein said second section forms a tray facing said first section and open to said concavity in said first section.

10. The seat assembly of claim 9, wherein said lock includes a latch and a striker.

11. The seat assembly of claim 10, wherein said lock further includes a key cylinder.

12. The seat assembly of claim 11, wherein said lock is electronic and is hidden from view in said seat base when said first and second sections are closed and locked.

13. The seat assembly of claim 1, further including an accordion storage file carried on said seat base.

14. The seat assembly of claim 1, wherein said first and second sections pivot about a shared axis.

15. The seat assembly of claim 1, further including a second pivot connection for pivotally attaching said seat back to said support.

\* \* \* \* \*